United States Patent
Bennett

(10) Patent No.: US 7,083,374 B2
(45) Date of Patent: Aug. 1, 2006

(54) GRIPPING MEMBERS GRIPPING AND MOVING PACKETS STACKED BY A CONVEYOR

(75) Inventor: Robert Bennett, West Midlands (GB)

(73) Assignee: Ishida Co., Ltd., Kyoto (JP)

( * ) Notice: Subject to any disclaimer, the term of this patent is extended or adjusted under 35 U.S.C. 154(b) by 45 days.

(21) Appl. No.: 10/671,658

(22) Filed: Sep. 29, 2003

(65) Prior Publication Data

US 2004/0070226 A1    Apr. 15, 2004

(30) Foreign Application Priority Data

Sep. 30, 2002 (GB) ................ 0222626.4

(51) Int. Cl.
*B65G 25/00* (2006.01)
*B65G 57/00* (2006.01)

(52) U.S. Cl. .............. 414/798.2; 198/470.1; 198/468.3; 198/475.1; 198/604; 198/726; 198/737; 198/803.4

(58) Field of Classification Search ........... 414/798.2, 414/751.1, 753.1, 789.9, 790.2; 198/604, 198/612, 623, 468.3, 726, 737, 803.1, 803.4, 198/470.1, 475.1; 53/542, 543; 294/119.1, 294/902
See application file for complete search history.

(56) References Cited

U.S. PATENT DOCUMENTS

| | | | | |
|---|---|---|---|---|
| 2,722,305 A * | 11/1955 | McCabe | ........... | 144/250.23 |
| 3,155,221 A * | 11/1964 | Griner | ........... | 198/419.3 |
| 3,402,803 A * | 9/1968 | Griner | ........... | 198/419.2 |
| 4,098,392 A * | 7/1978 | Greene | ........... | 198/419.3 |
| 4,360,110 A * | 11/1982 | Sigman et al. | ........... | 212/318 |
| 4,498,381 A * | 2/1985 | Convey, Jr. | ........... | 100/100 |
| 4,541,763 A * | 9/1985 | Chandhoke et al. | ........... | 414/790 |
| 4,611,705 A * | 9/1986 | Fluck | ........... | 414/798.9 |
| 4,676,934 A * | 6/1987 | Seah | ........... | 261/112.2 |
| 4,699,414 A * | 10/1987 | Jones | ........... | 294/119.1 |
| 4,740,025 A | 4/1988 | Nelson | ........... | 294/99.1 |
| 4,750,132 A * | 6/1988 | Pessina et al. | ........... | 414/751.1 |
| 4,824,307 A * | 4/1989 | Johnson et al. | ........... | 414/798.2 |
| 5,095,684 A * | 3/1992 | Walker et al. | ........... | 53/443 |
| 5,163,729 A * | 11/1992 | Borcea et al. | ........... | 294/119.1 |
| 5,425,565 A * | 6/1995 | Rogovein et al. | ........... | 294/119.1 |
| 5,464,316 A * | 11/1995 | Kranz | ........... | 414/798.2 |
| 5,588,285 A * | 12/1996 | Odenthal | ........... | 53/534 |
| 5,971,456 A * | 10/1999 | van Capelleveen | ........... | 294/88 |
| 6,164,436 A * | 12/2000 | Taylor | ........... | 198/689.1 |
| 6,182,814 B1 * | 2/2001 | Koehler | ........... | 198/418.7 |
| 6,321,896 B1 * | 11/2001 | Zuccheri et al. | ........... | 198/419.1 |
| 6,808,061 B1 * | 10/2004 | Dennert | ........... | 198/430 |

FOREIGN PATENT DOCUMENTS

| | | |
|---|---|---|
| EP | 0244050 | 11/1987 |
| EP | 0523872 | 1/1993 |
| EP | 1157951 A2 | 11/2001 |
| EP | 1157951 A3 | 11/2001 |
| FR | 2676955 | 12/1992 |

\* cited by examiner

*Primary Examiner*—Douglas Hess
(74) *Attorney, Agent, or Firm*—Staas & Halsey LLP

(57) ABSTRACT

A stacking conveyor conveys packets so that the conveyed packets become stacked together in a standing up configuration as an array of packets. First and second gripping members are automatically controlled so that the first and second gripping members mechanically move independently of each other to grip the array between the first and second gripping members and move the gripped array to a different location such as, for example, to a packaging station for packaging the array.

27 Claims, 2 Drawing Sheets

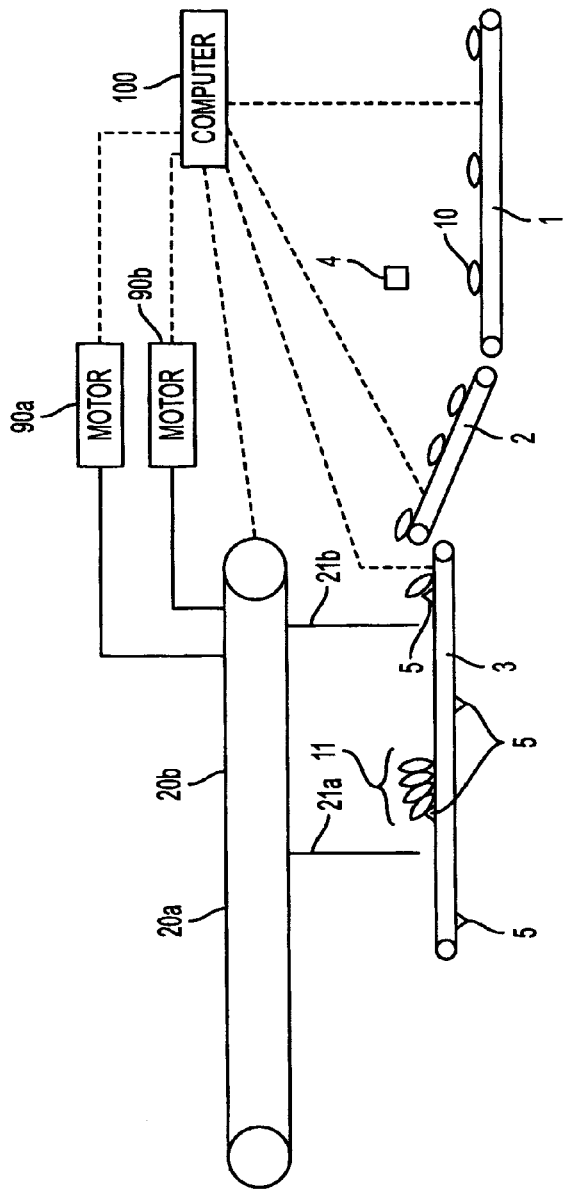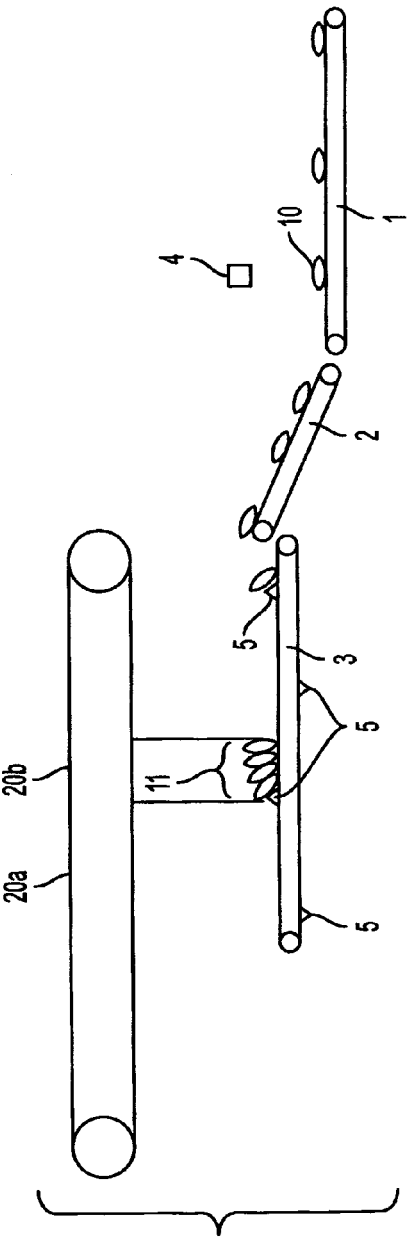

GRIPPING MEMBERS GRIPPING AND MOVING PACKETS STACKED BY A CONVEYOR

CROSS-REFERENCE TO RELATED APPLICATIONS

This application claims priority to GB application 0222626.4, filed Sep. 30, 2002, which is incorporated herein by reference in its entirety.

BACKGROUND OF THE INVENTION

1. Field of the Invention

This invention relates to removing collated stacks of packets from the end of a production line.

2. Description of the Related Art

A system for collating packets on a production line is described in British Patent Application No. 0208389.7. This system has an in-feed conveyor and a stacking conveyor on which discrete stacks of collated packets are formed. The in-feed conveyor runs at a constant speed and has an associated photodetector which detects the position of packets on the in-feed conveyor. This allows a computer to determine when the packets will reach the end of the infeed conveyor and fall onto the stacking conveyor. The computer is then able to control the motion of the stacking conveyor such that it decelerates just as the packet leaves the in-feed conveyor, thereby allowing the packet to land in a controlled fashion at a known location. The risk of the packet bouncing or skidding is reduced by using a high friction conveyor material.

Typically, this type of collating system is used to stack packets of snack products, such as, for example, potato chips, before the stacks of packets are finally packaged into a cardboard box. The individual stacks are conventionally removed from the stacking conveyor by a vacuum head which places the stacks into the cardboard box on an adjacent conveyor.

The vacuum head can only remove packets when the packets are in a laid down configuration. However, it is becoming increasingly desirable to package such packets in a standing up configuration since this prevents damage to the product during long distance haulage. As such, there exists a need for a system that can remove packets from a conveyor in a standing up configuration, and then package the packets.

SUMMARY OF THE INVENTION

Accordingly, it is an object of the present invention to remove packets from a conveyer in a standing up configuration, and then package the packets.

Objects of the present invention are achieved by providing an apparatus including (a) a stacking conveyor conveying packets so that the conveyed packets become stacked together in a standing up configuration as an array of packets; and (b) first and second gripping members automatically controlled so that the first and second gripping members mechanically move independently of each other to grip the array between the first and second gripping members and move the gripped array to a different location for processing of the array.

Objects of the present invention are further achieved by providing an apparatus including (a) a stacking conveyor conveying packets so that the conveyed packets become stacked together in a standing up configuration as an array of packets; (b) first and second endless belts on which the first and second gripping members are mounted, respectively; (c) first and second drive motors driving the first and second endless belts, respectively, the first and second drive motors and the first and second endless belts being configured so that the first and second gripping members mechanically move independently of each other; and (d) a controller automatically controlling the first gripping member via the first drive motor and the first endless belt and automatically controlling the second gripping member via the second drive motor and the second endless belt so that the first and second gripping members mechanically move independently of each other to grip the array between the first and second gripping members and move the gripped array to a different location for processing of the array.

Further, objects of the present invention are achieved by providing a method including (a) conveying packets so that the conveyed packets become stacked together in a standing up configuration as an array of packets; and (b) automatically controlling first and second gripping members so that the first and second gripping members mechanically move independently of each other to grip the array between the first and second gripping members and move the gripped array to a different location for processing of the array.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 1 is a diagram illustrating part of a production line with a gripper system for packaging packets of snack food, according to an embodiment of the present invention.

FIG. 2 is a diagram illustrating the gripping of an array of packets on a production line by a gripper system, according to an embodiment of the present invention.

DETAILED DESCRIPTION OF THE PREFERRED EMBODIMENTS

Figure 3:
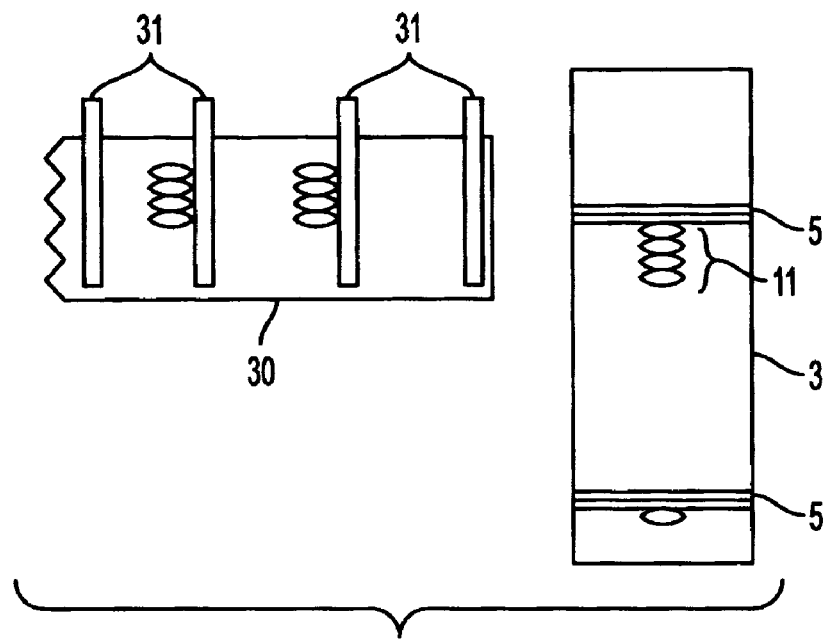
FIG. 3 is a diagram illustrating a bar conveying system to which an array of packets is transferred by a gripper system, according to an embodiment of the present invention.

Reference will now be made in detail to the present preferred embodiments of the present invention, examples of which are illustrated in the accompanying drawings, wherein like reference numerals refer to like elements throughout.

FIG. 1 is a diagram illustrating part of a production line with a gripper system for packaging packets of snack food, according to an embodiment of the present invention. Referring now to FIG. 1, an in-feed conveyor 1 leads to an inclined conveyor 2. In-feed conveyor 1 and inclined conveyor 2 might, for example, typically run at the same speed. In this example, inclined conveyor 2 is arranged such that its downstream end is at a slightly higher level than a stacking conveyor 3.

A photodetector 4 detects packets moving along in-feed conveyor 1. Since, in this embodiment, in-feed conveyor 1 and inclined conveyor 2 run at the same constant speed, it is possible to predict when a packet 10, such as a packet of snack food, will reach the downstream end of inclined conveyor 2. This prediction is a calculation performed by a computer 100 that also controls the motion of stacking conveyor 3. In order to stack an array of packets on stacking conveyor 3, stacking conveyor 3 can be driven, for example, at a constant speed slower than in-feed conveyor 1 and inclined conveyor 2. The speed of stacking conveyor 3 is chosen, for example, such that the total displacement of stacking conveyor 3 between the arrival of each packet at the downstream end of inclined conveyor 2 is less than the length of each packet.

In this example, a stacked array 11 of packets includes four packets. Of course, the present invention is not limited to any particular number of packets being included in a stacked array of packets. When array 11 has been produced, in this example, stacking conveyor 3 is, for example, accelerated momentarily such that a gap is produced between different arrays of packets.

Alternatively, for example, stacking conveyor 3 can be driven in a cyclic fashion, in which as a packet 10 leaves the downstream end of inclined conveyor 2, stacking. conveyor 3 begins to decelerate, thereby providing controlled braking for packet 10.

Stacking conveyor 3 is then accelerated such that, as the packet 10 is moved downstream and as the next packet leaves inclined conveyor 2, stacking conveyor 3 begins to decelerate again. The total displacement of stacking conveyor 3 during the acceleration and deceleration cycle is, for example, less than the length of each packet and so a stacked array 11 of packets is produced.

Again, when an array 11 of packets has been produced, stacking conveyor 3 is, for example, accelerated momentarily such that a gap is produced between different arrays of packets.

Stacking conveyor 3 is, for example, also provided with supports 5 which prevent the packets from lying flat. Stacking conveyor 3 is positioned such that the first packet to form an array will land against a support 5 as it leaves inclined conveyor 2.

There are many ways to control a conveyor to stack conveyed packets, and the present invention is not limited to any particular manner of control. Therefore, the present invention is not limited to the above examples of controlling a conveyor to stack conveyed packets. Moreover, there are many different configurations of conveyors for stacking packets, and the present invention is not limited to any particular configurations. Therefore, the present invention is not limited to the particular conveyor configurations described herein.

Typically, stacking conveyor 3 will be the end of a production line and so an array 11 of packets must be removed for packaging or some other operation. This task is performed by paddles 21a, 21b. Paddles 21a, 21b are gripping members which, as described below, operate together to grip an array 11 of packets.

FIG. 2 is a diagram illustrating the operation of paddles 21a, 21b to grip an array 11 of packets, according to an embodiment of the present invention. Referring now to FIG. 2, ach paddle 21a, 21b is independently driven, for example, on a respective one of a pair of laterally spaced endless belts 20a, 20b and as such can be independently positioned along the length of stacking conveyor 3. In some embodiments, separate drive motors 90a, 90b might be provided for separately driving endless belts 20a, 20b, respectively. An array 11 of packets is removed from stacking conveyor 3 by gripping the array 11 between paddles 21a, 21b.

Paddles 21a, 21b may be driven in a multiplicity of ways in order to grip an array 11 of packets. For example, paddle 21a may be positioned downstream of an array 11 of packets and remain stationary until such time as contact is established between the array 11 of packets and paddle 21a and then it may be driven with the same velocity as stacking conveyor 3. Alternatively, paddle 21a may be driven towards the downstream end of the array 11 of packets until contact is established between the array 11 of packets and paddle 21a, when its direction of motion would be reversed and its speed adjusted such that it moved at the same rate as stacking conveyor 3.

Paddle 21b is driven at a faster rate than stacking conveyor 3 until such time as it contacts the upstream end of array 11 of packets when it will proceed with the same speed as stacking conveyor 3.

Therefore, as indicated above, packets 10 can be stacked as an array 11, and then gripped as an array 11 by paddles 21a and 21b, by, for example, using differential speeds between paddles 21a and 21b, stacking conveyor 3, inclined conveyor 2 and in-feed conveyor 1.

It is possible to detect when paddles 21a, 21b make contact with an array 11 of packets in many ways. For example, paddles 21a,21b may be fitted with optical or mechanical sensors that respond when contact is established with the array of packets. Alternatively, it is possible to detect the positions of an array 11 of packets and paddles 21a,21b to establish whether they are in contact.

In the present embodiment, computer 100 can control in-feed conveyor, inclined conveyor 2, stacking conveyor 3, endless belt 20a, endless belt 20b, drive motor 90a and drive motor 90b, as indicated by dotted lines in FIG. 1. However, the present invention is not limited to computer 100 controlling each of these devices. Moreover, computer 100 is not limited to being a single computer, being any particular type of computer, or being in any specific location. Thus, computer 100 and the associated dotted lines are simply shown to indicate that a controller can be provided to control the various devices.

When an array 11 of packets has been gripped between paddles 21a,21b, as shown in FIG. 2, it is then removed from stacking conveyor 3. In one example, this is achieved by sliding the entire assembly comprising endless belts 20a,20b and paddles 21a,21b in a direction transverse to the direction of motion of stacking conveyor 3, such that it is disposed above a packaging conveyor (not shown) conveying, for example, cardboard boxes. This packaging conveyor lies, for example, adjacent to and parallel to stacking conveyor 3.

FIG. 3 is a diagram illustrating a bar conveying system to which an array of packets is transferred, according to an embodiment of the present invention. Referring now to FIG. 3, an array 11 of packets is transferred to a bar conveyor system in which each array of packets is driven along a conveying surface 30 by bar conveyors 31.

An array 11 of packets may be transferred in the same manner as described above by moving the entire gripping assembly such that it lies above conveying surface 30. However, the packets may instead be transferred, for example, by rotating the paddles using an elbow joint (not shown) in the paddles, such that they rotate through 90°, thereby displacing the packets to conveying surface 30. Alternatively, for example, this rotational motion may be combined with the translational motion of the entire gripping system already described.

The bar conveyor system comprising conveying surface 30 and bar conveyors 31 conveys an array 11 of packets for further operations to be performed upon the array 11. For example, the array 11 of packets may be conveyed to a bagging machine (not shown) which seals the array 11 of packets in a bag. In another alternative arrangement, the array 11 of packets can, for example, be carried by paddles 21a, 21b beyond the downstream end of stacking conveyor 3 and released into a container, such as a cardboard box, or onto a further conveyor system.

Figure 4:
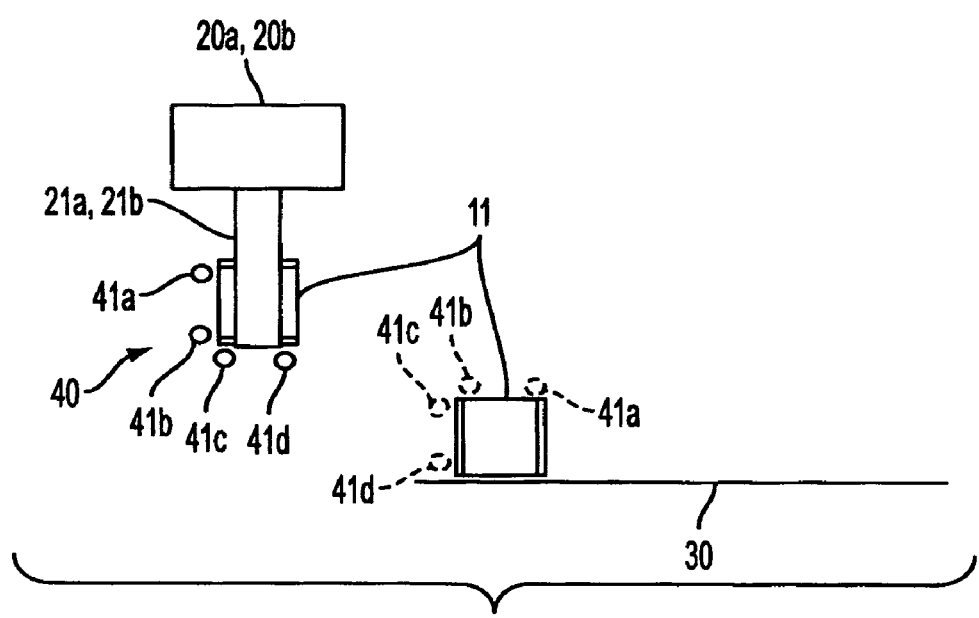
FIG. 4 is a diagram illustrating a holding cage for use with a gripper system, according to an embodiment of the present invention.

FIG. 4 is a diagram illustrating a holding cage for use with a gripper system, according to an embodiment of the present invention. More specifically, FIG. 4 shows a further arrangement for removing array 11 of packets from paddles 21a, 21b. Referring now to FIG. 4, a holding cage 40 comprises, for example, four support poles 41a to 41d. Support poles 41a to 41d are, for example, movable between a receiving position (shown in solid lines) and a delivering position (shown in dashed lines). In the receiving position, the array 11 of packets is positioned on holding cage 40 and released there such that the array 11 of packets is then supported by support poles 41a to 41d. When paddles 21a,21b have released the array 11 of packets, holding cage 40 is rotated into the position shown in dashed lines, thereby transferring the array 11 of packets to conveying surface 30.

The present invention relates to apparatus for handling packets comprising a packet supply system for supplying packets to a stacking location; and a gripping system having at least one pair of independently mounted and movable gripper assemblies, each having at least one gripper member. Each gripper member is movable relative to the stacking location. A control system causes the gripper members to grip a stack of packets therebetween and move the stack of packets from the stacking location. Each of the gripper assemblies is, for example, mounted on an individual endless belt. Moreover, as an example, the gripping system includes a respective drive motor for each gripper assembly. The gripper members are, for example, paddles which have, for example, a high friction surface for gripping the packets. According to above embodiments of the present invention, the packet supply system comprises an in-feed conveyor and a stacking conveyor for stacking the packets in discrete groups. According to above embodiments of the present invention, the gripper members move, for example, one discrete stack of packets from the stacking location at a time. The packets are moved, for example, to a packaging station by, for example, rotating the gripping members or, for example, sliding the gripper assemblies to the packaging station.

According to embodiments of the present invention, a packet supply system supplies packets to a stacking location. A gripping system has at least one pair of independently mounted and movable gripper assemblies, each having at least one gripper member. Each gripper member is movable relative to the stacking location. A control system causes the gripper members to grip a stack of packets therebetween and move the stack of packets from the stacking location.

Accordingly, the present invention provides a new and versatile method and apparatus for transferring products from a stacking location. Specifically, the present invention allows for packets such as snack food packets in a standing up configuration to be gripped.

According to above embodiments of the present invention, gripper assemblies (including paddles 21a, 21b) are mounted on individual endless belts although other arrangements, such as mounting the gripper assemblies on individual hydraulic rams, are possible. Typically, the gripping system comprises one drive motor for each gripper assembly. The gripper members are preferably paddles and the gripper members normally have a high friction surface for gripping the packets. Typically, the packet supply system comprises an in-feed conveyor and a stacking conveyor for stacking the packets in discrete groups.

In various embodiments of the present invention, paddles 21a and 21b can be driven by servo motors or other drive mechanisms which allow the gripping force between paddles 21a and 21b to be changed a gripped array 11 is being moved.

Above embodiments of the present invention relate to a continuous collating, gripping and placing system that runs in one direction. More specifically, packets 10 are continuously collated into arrays 11, and arrays 11 are continuously gripped and moved by paddles 21a and 21b in a sequential, assembly line manner. Moreover, this continuous system runs in one direction. That is, packets 10 and arrays 11 continuously move downstream along a conveying/gripping/moving route. Accordingly, packets 10 and arrays 11 continuously flow downstream along the conveying/gripping/moving route.

Above embodiments of the present invention relate to the use of paddles 21a and 21b to move an array 11. Servo motors can be used to control paddles 21a and 21b to provide appropriate control and range of movement of paddles 21a and 21b necessary to move an array 11 to a proper location.

Above embodiments of the present invention relate to a stacking conveyor conveying packets so that the conveyed packets become stacked together in a standing up configuration as an array of packets. In a typical embodiment, a packet is a pillow-type bag. Pillow-type bags are well-known types of bags typically used to hold snack foods such as, for example, potato chips, pretzels, etc. However, the present invention is not limited to a pillow-type bag containing any particular type of snack food.

Above embodiments of the present invention relate to stacking packets in a "standing up configuration". Packets, such as well-known pillow-type bags holding snack foods, can be considered to have two sides, a top and a bottom. Such pillow-type bags have a tendency to lay flat on a side, parallel to a main supporting surface such as the surface of a conveyor belt. A "standing-up configuration" indicates that the bags are not flat on a side, and are instead at an angle up to 90 degrees to the main supporting surface such as the surface of a conveyor belt, with the top or bottom of the pillow-type bag preferably touching the main supporting surface. It is respectfully submitted that a "standing-up configuration" of a packet or pillow-type bag would be well-understood by a person of skill in the art from the disclosure herein and the figures.

Above embodiments of the present invention relate to first and second gripping members automatically controlled so that the first and second gripping members mechanically move independently of each other. "Mechanical" movement indicates that the gripping members move via mechanical devices, such as, for example, motors, belts, hydraulic equipment. However, the present invention is not limited to any particular mechanical devices for moving the gripping members. "Independent" movement indicates that the either of the gripping members can be moved separately from, and without dependence on the location of, the other gripping member.

According to above embodiments of the present invention, gripping members move an array of packets from a stacking conveyor to a different location for processing the array. For example, the array can be moved to a packaging system for packaging the array. However, the present invention is not limited to an array being moved to any particular location.

Above embodiments of the present invention relate to first and second gripping members being "automatically" controlled. "Automatic" indicates that the control is performed by computer processing in an automated manner. For example, computer processing is used to control mechanical devices such as, for example, motors, belts, etc., to appropriate move the first and second gripping members. The concept of "automatic control" of mechanical components, such as robots, machinery, gripping members, etc., would be well-understood by a person of ordinary skill in the art.

Above embodiments of the present invention relate to gripping members, such as paddles, having surfaces which contact an array of packets and have sufficient friction for gripping and moving the gripped array. The present invention is not limited to any particular friction level. Instead, a sufficient friction level would depend, for example, on the size of the contact area between the gripping members and the array of packets, the material of the contact areas, the weight of the array, etc. It is respectfully submitted that a person of ordinary skill in the art would understand and be able to determine a sufficient friction level which would be required to grip and move the array, based on design parameters.

The present invention relates to packets being conveyed, gripped and moved. However, the present invention is not limited to "packets", and instead is applicable to other items which may be conveyed, gripped and moved.

The present invention relates to gripping members being "paddles". However, the present invention is not limited to gripping members being "paddles", and other types or shapes of gripping members can be used.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
   a stacking conveyor conveying packets so that the conveyed packets become stacked together in a standing up configuration as an array of packets extending along a length of the stacking conveyor; and
   first and second gripping members automatically controlled so that the first and second gripping members mechanically move independently of each other along the entire length of the stacking conveyor to grip the array between the first and second gripping members and carry the gripped array via gripping force between the first and second gripping members to a different location for processing of the array.

2. An apparatus as in claim 1, further comprising:
   first and second endless belts on which the first and second gripping members are mounted, respectively, so that the first and second gripping members mechanically move independently of each other.

3. An apparatus as in claim 1, further comprising:
   first and second drive motors for driving the first and second gripping members, respectively, so that the first and second gripping members mechanically move independently of each other.

4. An apparatus as in claim 1, further comprising:
   first and second endless belts on which the first and second gripping members are mounted, respectively; and
   first and second drive motors for driving the first and second endless belts, respectively, the first and second drive motors and the first and second endless belts being configured so that the first and second gripping members mechanically move independently of each other.

5. An apparatus as in claim 1, wherein the first and second gripping members are paddles.

6. An apparatus as in claim 1, wherein the first and second gripping members have surfaces which contact the array and have sufficient friction for gripping and carrying the gripped array.

7. An apparatus as in claim 1, wherein the first and second gripping members are paddles having surfaces which contact the array and have sufficient friction for gripping and carrying the gripped array.

8. An apparatus as in claim 1, wherein the packets are pillow-type bags.

9. An apparatus as in claim 1, wherein the first and second gripping members are automatically controlled so that the first and second gripping members mechanically move independently of each other to grip the array between the first and second gripping members as the array is being conveyed in a conveying direction by the conveyor.

10. An apparatus as in claim 9, wherein the first and second gripping members are automatically controlled by positioning the first gripping member at a stationary position downstream of the array as the array is conveyed by the conveyor to cause contact to be established between a downstream end of the array and the first gripping member, and moving the second gripping member to contact an upstream end of the array as the array is conveyed, to thereby cause the array to be gripped between the first and second gripping members.

11. An apparatus as in claim 9, wherein the first and second gripping members are automatically controlled by causing the first gripping member to move towards the array from downstream of the array as the array is conveyed by the conveyor to thereby cause contact to be established between a downstream end of the array and the first gripping member, and moving the second gripping member to contact an upstream end of the array as the array is conveyed, to thereby cause the array to be gripped between the first and second gripping members.

12. An apparatus as in claim 1, wherein the array is carried by rotating the first and second gripping members while the array is gripped between the first and second gripping members.

13. An apparatus as in claim 1, wherein the array is carried by sliding the first and second gripping members while the array is gripped between the first and second gripping members.

14. An apparatus as in claim 1, wherein the stacking conveyor conveys packets to produce a plurality of arrays of packets, the first and second gripping members being automatically controlled to sequentially grip each respective array and carry the array to said different location.

15. An apparatus as in claim 1, wherein the first and second gripping members carry the gripped array to a packaging station for packaging the array.

16. An apparatus as in claim 1, wherein the gripping force between the first and second gripping members is changeable as the array is being carried.

17. An apparatus as in claim 1, wherein the stacking conveyor and the first and second gripping members are arranged so that packets and arrays continuously move downstream along a conveying/gripping/moving route.

18. An apparatus comprising:
a stacking conveyor conveying packets so that the conveyed packets become stacked together in a standing up configuration as an array of packets along a length of the stacking conveyor;
first and second gripping members; and
means for automatically controlling the first and second gripping members so that the first and second gripping members mechanically move independently of each other along the entire length of the stacking conveyor to grip the array between the first and second gripping members and move the gripped array to a different location for processing of the array.

19. An apparatus comprising:
a stacking conveyor conveying packets so that the conveyed packets become stacked together in a standing up configuration as an array of packets;
first and second endless belts on which first and second gripping members are mounted, respectively;
first and second drive motors driving the first and second endless belts, respectively, the first and second drive motors and the first and second endless belts being configured so that the first and second gripping members mechanically move independently of each other; and
a controller automatically controlling the first gripping member via the first drive motor and the first endless belt and automatically controlling the second gripping member via the second drive motor and the second endless belt so that the first and second gripping members mechanically move independently of each other to grip the array between the first and second gripping members and move the gripped array to a different location for processing of the array.

20. An apparatus as in claim 19, wherein the first and second gripping members are paddles.

21. An apparatus as in claim 19, wherein the first and second gripping members have surfaces which contact the array and have sufficient friction for gripping and moving the gripped array.

22. An apparatus as in claim 19, wherein the packets are pillow-type bags.

23. An apparatus as in claim 22, wherein the first and second gripping members are controlled to grip the array as the array is being conveyed.

24. An apparatus as in claim 19, wherein the first and second gripping members are controlled to grip the array as the array is being conveyed.

25. A method comprising:
conveying packets so that the conveyed packets become stacked together in a standing up configuration as an array of packets along a length of a conveyor; and
automatically controlling first and second gripping members so that the first and second gripping members mechanically move independently of each other along the entire length of the conveyor to grip the array between the first and second gripping members and move the gripped array to a different location for processing of the array.

26. An apparatus comprising:
a stacking conveyor conveying packets so that the conveyed packets become stacked together in a standing up configuration as an array of packets;
first and second gripping members automatically controlled so that the first and second gripping members mechanically move independently of each other to grip the array between the first and second gripping members and move the gripped array to a different location for processing of the array;
first and second endless belts on which the first and second gripping members are mounted, respectively; and
first and second drive motors for driving the first and second endless belts, respectively, the first and second drive motors and the first and second endless belts being configured so that the first and second gripping members mechanically move independently of each other.

27. An apparatus comprising:
a stacking conveyor conveying packets so that the conveyed packets become stacked together in a standing up configuration as an array of packets;
first and second gripping members automatically controlled so that the first and second gripping members mechanically move independently of each other to grip the array between the first and second gripping members and carry the gripped array via gripping force between the first and second gripping members to a different location for processing of the array;
first and second endless belts on which the first and second gripping members are mounted, respectively; and
first and second drive motors for driving the first and second endless belts, respectively, the first and second drive motors and the first and second endless belts being configured so that the first and second gripping members mechanically move independently of each other.

* * * * *